United States Patent
Bubenhofer et al.

(10) Patent No.: US 8,109,811 B2
(45) Date of Patent: Feb. 7, 2012

(54) AIR DUCT SYSTEM

(75) Inventors: Max Bubenhofer, Dingolfing (DE); Robert Pusl, Moosburg (DE); Michael Windl, Landshut (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 109 days.

(21) Appl. No.: 11/361,031

(22) Filed: Feb. 23, 2006

(65) Prior Publication Data

US 2006/0240760 A1    Oct. 26, 2006

(30) Foreign Application Priority Data

Feb. 25, 2005   (DE) .......................... 10 2005 008 730

(51) Int. Cl.
*B60H 1/00* (2006.01)
*E04H 7/22* (2006.01)
(52) U.S. Cl. ........................................ 454/69; 454/182
(58) Field of Classification Search ................ 454/69
See application file for complete search history.

(56) References Cited

U.S. PATENT DOCUMENTS

| 2,679,796 | A | * | 6/1954 | Froelich et al. ............... 454/331 |
| 3,388,482 | A | * | 6/1968 | Rotenburger .................. 34/210 |
| 6,231,098 | B1 | | 5/2001 | Schenk et al. |
| 6,338,514 | B1 | | 1/2002 | Arold et al. |

FOREIGN PATENT DOCUMENTS

| DE | 30 34 431 A1 | 4/1982 |
| DE | 198 26 943 A1 | 12/1999 |
| DE | 199 35 270 A1 | 2/2001 |

* cited by examiner

*Primary Examiner* — Steven B McAllister
*Assistant Examiner* — Helena Kosanovic
(74) *Attorney, Agent, or Firm* — Wolf, Greenfield & Sacks, P.C.

(57) ABSTRACT

An air duct for installation in a passenger compartment of a vehicle includes duct walls defining the cross-section of the air duct, such as a top duct wall and a bottom duct wall. The bottom duct wall may contain a fixing hole, whereas the top duct wall may contain an access hole. The air duct may be fixed directly to the vehicle body by a fastener, such as a screw, through the fixing hole in the bottom duct wall. To prevent air from escaping through the fixing hole, an outer wall of the bottom duct wall may be shaped at least in the area of the fixing hole so that it lies flush with and essentially air-tight against the vehicle body. After attachment, the access hole may be suitably sealed to prevent air from escaping.

13 Claims, 2 Drawing Sheets

AIR DUCT SYSTEM

BACKGROUND

1. Field

Aspects of the invention relate to air ducts for passenger compartments of a motor vehicle, and more particularly to air ducts which are integrated into center consoles and attached to vehicle bodies.

2. Discussion of Related Art

Air ducts in the passenger compartment of a motor vehicle serve to distribute hot or cold air from the vehicle's air conditioning or ventilation system mounted in the front section of the vehicle (engine compartment) and also to transport it to the rear area of the vehicle. Such generic air ducts have an air-carrying cross-section that is defined by the walls enclosing the air duct. Conventionally, mounting lugs are attached externally to these walls in an appropriate position, and fixed to the vehicle body with screws. Although this type of mounting may not penetrate the cross-section carrying the air, the space required by the lugs constricts the available cross-section of the air duct in the vicinity of the lugs. In addition, there is a loss of installation space for other mounting parts.

SUMMARY

In one illustriative embodiment, an air duct for a passenger compartment of a vehicle is provided. The vehicle has a body. The air duct includes a top duct wall having a sealable access hole penetrating therethrough and a bottom duct wall having a fixing hole penetrating therethrough. An outer wall around the bottom duct wall is adapted to lie flush with and essentially air-tight against the vehicle body at least in the peripheral area of the fixing hole when the air duct is fixed to the vehicle body by means of a screw.

In another illustrative embodiment, an air duct for a vehicle passenger compartment is provided. The air duct includes a bottom duct wall including a fixing hole and an outer wall surrounding the fixing hole. The outer wall is adapted to lie substantially flush with and form a substantially air-tight seal against the vehicle body to which the air duct is attached. A fastener is adapted to extend through the fixing hole to secure the duct to the portion of the vehicle body.

In yet another illustrative embodiment, a method of securing an air duct to a vehicle body is provided. The method includes inserting a fastener into the duct through an access hole in a top duct wall of the duct, inserting the fastener in a fixing hole in a bottom duct wall of the duct, and securing the fastener to the vehicle body in a substantially air-tight sealing manner between the bottom duct wall and the vehicle body.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments of the invention will now be described, by way of example, with reference to the accompanying drawings, in which.

DETAILED DESCRIPTION

Figure 1:
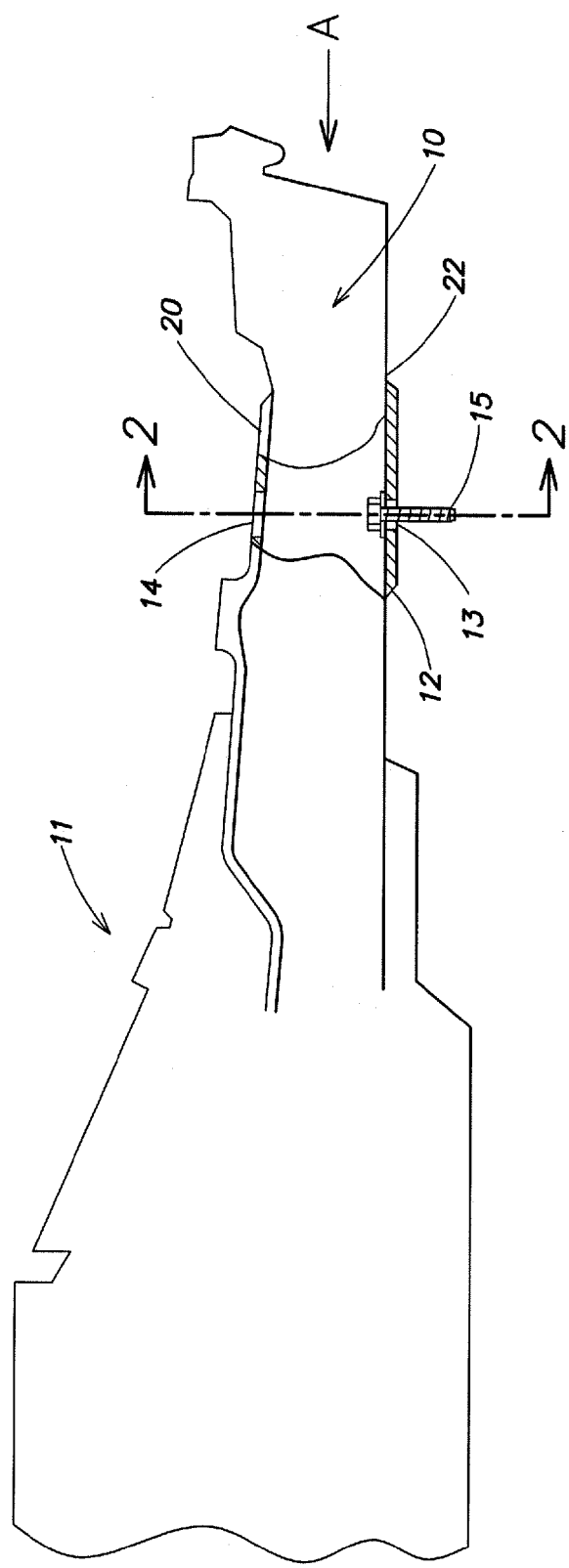
FIG. 1 is a cross-sectional side view of an illustrative embodiment of a center console with an integrated air duct.

Aspects of the present invention are directed to an air duct which may enable a maximum supply of air by providing the largest possible cross-section of the air duct and/or may utilize the available installation space with the maximum space savings without sacrificing structural strength. According to one aspect of the invention, the air duct may be installed in a passenger compartment of a vehicle and may include duct walls defining the cross-section of the air duct, such as at least a top duct wall and a bottom duct wall. In some embodiments, the bottom duct wall may contain a fixing hole, where as the top duct wall may contain an access hole. After installation, the access hole may be suitably sealed to prevent air from escaping. The air duct may be fixed directly to the vehicle body by a fastener, such as a screw, through the fixing hole in the bottom duct wall. Other suitable fasteners may be used, as the present invention is not limited in this respect. To prevent air from escaping through the fixing hole, an outer wall of the bottom duct wall may be shaped at least in the area of the fixing hole so that it lies flush with and essentially air-tight against the vehicle body. In addition or alternatively, a gasket may be provided at the fixing hole to further improve air-tightness at the hole in the bottom duct wall.

In some embodiments, the access hole in the top duct wall may be dimensioned so that access to the screw in the fixing hole may be gained. For example, an assembly screwdriver may introduce a screw through the access hole, insert the screw into the fixing hole and screw the screw down. After assembly, the access hole may be sealed with a suitable cover. In some embodiments, a sealing stopper may be used as the cover, sealing the access hole so that it is substantially air-tight.

In some embodiments, the cover may also be a decorative layer overlying the air duct, which may be compatible with the design of the passenger compartment. This configuration may eliminate the need for a separate decorative cover.

In some embodiments, the air duct may be integrated in a center console of a vehicle and may be fixed to the vehicle body by a fastener, such as a screw through the bottom duct wall of the air duct. In one embodiment, the center console may be produced with an air duct as a complete assembly unit.

The above-described embodiments may provide a maximum cross-section of the air duct, wherein the air duct may not be constricted either by mounting lugs, or by mounting elements which may pass through the cross-section. Fixing the air duct using a fastener through the bottom duct wall may also free up additional space around the air duct, which may have otherwise been required to secure the air duct, for other components. In addition, the vicinity of the fixing hole may be made substantially air-tight by the design of the bottom duct wall. These benefits may be achieved without impairing the structural strength of the connection between the air duct and the vehicle body, because the stiffness of the air duct may enhance the strength of the screwed connection.

Although the embodiments herein are described with reference to an air duct in a center console of a vehicle, the present invention is not limited in this respect, as the arrangement may be used to secure other ducts to other vehicle structures.

According to one aspect of the invention, two air ducts may be integrated into a center console of a vehicle. In some embodiments, one, three, four or more air ducts may be integrated into the center console, as the present invention is not intended to be limited in this respect. One example of an air duct is shown in the embodiment depicted in the cross-sectional view of FIG. 1. Air duct 10 may be integrated into a center console 11 of vehicle. Hot or cold air may be transported via air duct 10 from a front area of the vehicle to a rear area of the vehicle; this flow direction is indicated in FIG. 1 by arrow A. The side wall of the air duct is cut away so as to show the screwed connection in the section of the center console through which the gear lever is later connected to the gearbox.

Figure 2:
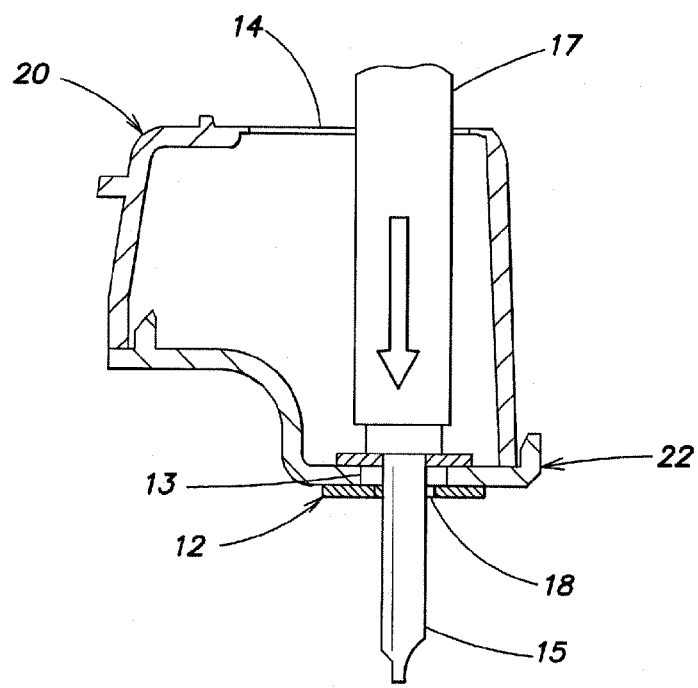
FIG. 2 is a cross-sectional side view of an illustrative embodiment of the air duct taken along line 2-2 of FIG. 1 during installation.
Figure 3:
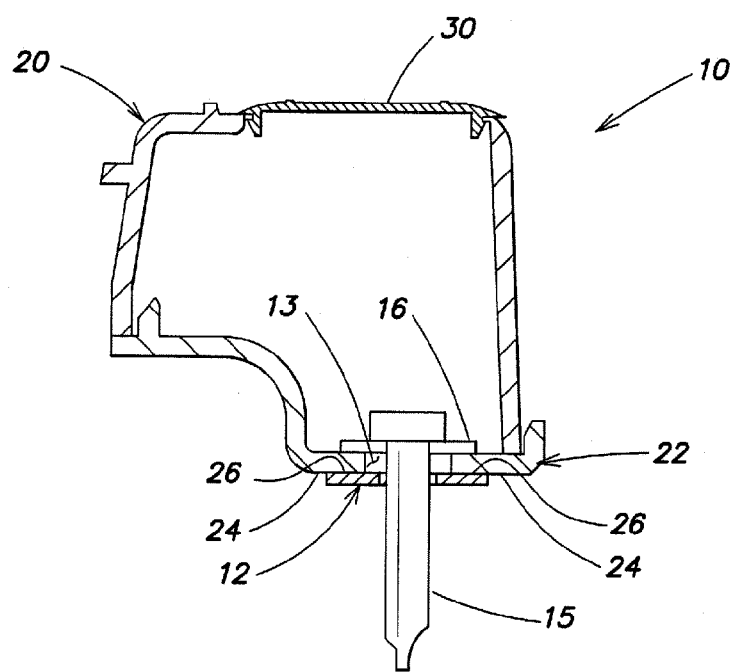
FIG. 3 is a cross-sectional side view of an illustrative embodiment of the air duct taken along line 2-2 of FIG. 1 after installation.

As shown in the embodiments depicted in FIGS. 1-3, air duct 10 includes a top duct wall 20 and a bottom duct wall 22. Portions of the outer wall 24 of bottom duct wall 22 may form a contact surface with vehicle body 12. In the area of the contact surface with vehicle body 12, bottom duct wall 22 may have a hole 13 through which a fastener, such as screw 15, may be passed. Screw 15 may be screwed into a corresponding screw hole 18 of vehicle body 12 to fix bottom duct wall 22 of air duct 10 to vehicle body 12. In some embodiments, a washer 16 may be employed to support the load of screw 15 and/or to promote a fluid-tight connection. Washer 16 may be any type of washer, such as flat, split, star, or insulated, and/or may be integrally formed with the screw as a collar of the screw (not shown). It should be appreciated that other load-support and/or sealing devices may be used in addition, as the present invention is not intended to be limited in this respect.

As a result of the tensile force exerted by screw 15, outer wall 24 of bottom duct wall 22 may be pressed, at least in part, flush with and substantially air-tight against the corresponding wall surface 26 of vehicle body 12. In some embodiments, a complete seal may be achieved when outer wall 24 lies against vehicle body 12. It should be appreciated that outer wall 24 of bottom duct wall 22 and corresponding wall surface 26 of vehicle body 12 may be formed to mate with one another, so that the two surfaces will lie flush with one another. In addition or alternatively, outer wall 24 and/or corresponding wall surface 26 may include a suitable sealing material.

To make screw 15 accessible for installation, in on embodiment, an access hole 14 is provided in the top duct wall 20. Access hole 14 may enable screw 15 to be introduced into and secured within air duct 10 by means of an assembly screwdriver 17. In one embodiment, screw 15 may be introduced into air duct 10 through access hole 14, inserted into fixing hole 13 and screwed into to vehicle body 12 using assembly screwdriver 17, as shown in the embodiment depicted in FIG. 2. To make installation easier and/or to enable manual access to fixing hole 13, access hole 14 may be dimensioned larger than fixing hole 13. Fixing hole 13 may only require a diameter equal to or slightly larger than the shaft diameter of screw 15 (which may also correspond to the diameter of corresponding screw hole 18 of vehicle body 12), but may also have a diameter greater than the shaft diameter of screw 15 and/or the diameter of corresponding screw hole 18. It should be appreciated that access hole 14 may be any suitable size, as the present invention is not limited in this respect.

As shown in the embodiment depicted in FIG. 3, once the installation procedure for the air duct, that is the screwing of air duct 10 to vehicle body 12, has been completed, a cover, such as sealing stopper 30, may be inserted into top access hole 14 to create a substantially air-tight seal. In one embodiment, sealing stopper 30 may also include a decorative layer lying on the top duct wall of the air duct. Thus, at least in the vicinity of access hole 14, the decorative layer may include a suitable air-tight material. The decorative layer may be any suitable size, shape, color and/or texture to complement the vehicle.

It should be appreciated that although the above-described embodiments employ a screw to secure the air duct to the vehicle, any type of fastener may be employed as the present invention is not intended to be limited in this respect. Further, it should be appreciated that the sizes of the access and fixing holes, as well as the structure and size of the corresponding portion of the vehicle to which the fastener attaches, may depend upon the type of fastening device employed.

In addition or alternatively, one air duct may employ one or more fasteners to secure it to the vehicle, as the present invention contemplates the use of one or more fasteners and is not intended to be limited in this respect. It should be appreciated that any materials, such as metals, plastics, rubbers, woods, foams, or any other natural or synthetic material, or any combination of materials having any color, texture or other properties, may be used to form any of the elements of the air duct, as the present invention are intended to be limited in this respect.

The foregoing written specification is to be considered to be sufficient to enable one skilled in the art to practice the invention. While the best mode for carrying out the invention has been described in detail, those skilled in the art to which this invention relates will recognize various alternative embodiments including those mentioned above as defined by the following claims. The examples disclosed herein are not to be construed as limiting of the invention as they are intended merely as illustrative of particular embodiments of the invention as enabled herein. Therefore, systems and methods that are functionally equivalent to those described herein are within the spirit and scope of the claims appended hereto. Indeed, various modifications of the invention in addition to those shown and described herein will become apparent to those skilled in the art from the foregoing description and fall within the scope of the appended claims.

What is claimed is:

1. A vehicle comprising:
   a vehicle body; and
   an air duct for a passenger compartment of the vehicle, the air duct fixed to the vehicle body and comprising:
     a top duct wall having a sealable access hole penetrating therethrough;
     a cover for sealing the access hole, the cover comprising a plurality of latch members;
     a bottom duct wall having a fixing hole penetrating therethrough, first and second opposing side duct walls extending between the top duct wall and the bottom duct wall, the fixing hole receiving a screw to hold the bottom wall against the vehicle body and being aligned with the sealable access hole when the bottom duct wall is connected to the top duct wall via the first and second opposing side duct walls to define an air flow passageway that is in contact with a cover of the sealable access hole and the fastener in the fixing hole, the airflow passageway being defined directly between the top duct wall, the bottom duct wall and the first and second side duct walls to provide a single undivided airflow passageway; and an outer wall around the bottom duct wall, the outer duct wall lying flush with and essentially air-tight against the vehicle body at least in the peripheral area of the fixing hole, wherein a gasket is provided at the fixing hole in the bottom duct wall.

2. The vehicle according to claim 1, wherein the access hole in the top duct wall is dimensioned such that it enables access to the screw in the fixing hole of the bottom duct wall and can be sealed off by means of a cover.

3. The vehicle according to claim 2, wherein the cover is a sealing stopper.

4. The vehicle according to claim 2, wherein the cover is a decorative layer lying on the top duct wall of the air duct.

5. The vehicle according to claim 1, wherein the air duct is integrated into a center console of the vehicle and wherein the air duct is fixed to the vehicle body by way of the screw going through the bottom duct wall.

6. A vehicle comprising:
a vehicle body; and
   an air duct for a passenger compartment of the vehicle, the air duct fixed to the vehicle body and comprising:
   a top duct wall having a sealable access hole penetrating therethrough, portions of the top duct wall adjacent to the access hole;
   a cover for sealing the access hole, the cover comprising a plurality of latch members;
   a bottom duct wall, first and second opposing side duct walls extending between the top duct wall and the bottom duct wall, the bottom duct wall connected to the top duct wall via the first and second opposing side duct walls the top duct wall, overlying at least a portion of the bottom duct wall to define a duct air flow passageway that is enclosed directly between the top duct wall, the bottom duct wall and the first and second side duct walls to provide a single undivided airflow passageway, the bottom duct wall including a fixing hole and an outer wall surrounding the fixing hole, the outer wall lying substantially flush with and forming a substantially air-tight seal against the vehicle body to which the air duct is attached; and
   a fastener extending through the fixing hole to secure the duct to the portion of the vehicle body with at least a portion of the fastener exposed to the duct air flow passageway;
   wherein portions of the top duct wall that are adjacent to the sealable access hole face toward the duct air flow passageway and the bottom duct wall, wherein a gasket is provided at the fixing hole in the bottom duct wall.

7. The vehicle of claim 6, further comprising a cover for covering and creating an air-tight seal with the access hole.

8. The vehicle of claim 6, wherein said fastener includes a screw.

9. The vehicle of claim 8, wherein said fastener includes a washer.

10. The vehicle of claim 6, wherein the access hole is dimensioned to provide access to the fixing hole of said bottom duct wall.

11. The vehicle of claim 7, wherein the cover includes a decorative layer substantially flush with or on top of said top duct wall.

12. The vehicle of claim 6, wherein the access hole is dimensioned to provide access to the fixing hole.

13. The vehicle of claim 6, in combination with a center console of a vehicle, wherein the air duct is integrated into said center console.

* * * * *